US008950968B2

(12) United States Patent
Reimchen et al.

(10) Patent No.: US 8,950,968 B2
(45) Date of Patent: Feb. 10, 2015

(54) SYSTEM FOR THE CONNECTION OF TWO COMPONENTS, RETAINING MEMBER FOR SAID SYSTEM, AND MIRROR ASSEMBLY FOR AUTOMOTIVE VEHICLES EQUIPPED WITH SAID SYSTEM

(75) Inventors: Richard Reimchen, Ansbach (DE); Jochen Denkfelder, Gunzenhausen (DE); Albrecht Popp, Weihenzell (DE)

(73) Assignee: Mekra Lang GmbH & Co. KG, Fürth (DE)

( * ) Notice: Subject to any disclaimer, the term of this patent is extended or adjusted under 35 U.S.C. 154(b) by 245 days.

(21) Appl. No.: 13/350,594

(22) Filed: Jan. 13, 2012

(65) Prior Publication Data
US 2012/0182637 A1 Jul. 19, 2012

(51) Int. Cl.
*F16B 7/10* (2006.01)
*F16B 7/04* (2006.01)
*B60R 1/00* (2006.01)

(52) U.S. Cl.
CPC .. *F16B 7/042* (2013.01); *B60R 1/00* (2013.01)
USPC ...................................... 403/109.3

(58) Field of Classification Search
USPC ............. 403/109.1–109.4, 109.6–109.8, 378, 403/379.1–379.3
See application file for complete search history.

(56) References Cited

U.S. PATENT DOCUMENTS

| | | | | |
|---|---|---|---|---|
| 2,982,586 | A * | 5/1961 | Gliebe | 403/109.3 |
| 4,104,000 | A * | 8/1978 | Fleischmann | 403/7 |
| 4,146,341 | A * | 3/1979 | Smith | 403/174 |
| 6,305,671 | B1 * | 10/2001 | Valentine | 256/65.13 |
| 6,722,810 | B1 * | 4/2004 | Tachikawa | 403/362 |
| 7,334,957 | B2 * | 2/2008 | Sadinsky et al. | 403/109.3 |
| 8,491,215 | B2 * | 7/2013 | Young | 403/109.3 |

FOREIGN PATENT DOCUMENTS

| | | |
|---|---|---|
| DE | 2535458 | 2/1977 |
| DE | 2950742 | 6/1981 |
| DE | 9310437 | 8/1993 |
| DE | 600 25 104 | 8/2006 |
| EP | 1 086 855 | 12/2005 |
| GB | 2065259 | 6/1981 |

OTHER PUBLICATIONS

Vibration Resistance Vehicle Mirror Connecting Assembly, CN 1836935A; Zusammenfassung; http://www.google.com/patents/CN1836935A; 1 von 6; Dec. 16, 2013 14:06.

* cited by examiner

*Primary Examiner* — Michael P Ferguson
*Assistant Examiner* — Daniel Wiley
(74) *Attorney, Agent, or Firm* — O'Melveny & Myers LLP

(57) ABSTRACT

A mirror assembly system for use in automotive vehicles is provided. In one embodiment of the presented invention, a first connecting member has the form of a tubular flange member, with a first contact surface and a first groove being provided inside the flange member. A second connecting member is adapted to be introduced with play into the tubular flange member, with the second connecting member comprising a base body. On the base body a first retaining boss for engagement in the first groove and a guide surface arranged behind the retaining boss are provided, with the guide surface being associated to the first contact surface. A clamping device passes through the flange member and, when actuated, presses against a first pressure surface on the base body so that the inclined guide surface presses against the first contact surface, to thus jam the mounting member inside the flange member.

14 Claims, 5 Drawing Sheets

SYSTEM FOR THE CONNECTION OF TWO COMPONENTS, RETAINING MEMBER FOR SAID SYSTEM, AND MIRROR ASSEMBLY FOR AUTOMOTIVE VEHICLES EQUIPPED WITH SAID SYSTEM

BACKGROUND OF THE INVENTION

1. Field of the Invention

The invention relates to a system for the connection of two components, a mounting member for a like system, and a mirror assembly for automotive vehicles comprising a like system.

2. Description of Related Art

When two components, at least one of which has a tubular or sleeve-type shape, are connected by insertion over a certain partial amount of their lengths, it is often required in practice to provide this inserted connection not loosely but in a secured manner in the sense of a relative, non-rotational and non-adjustable immobilization of the positions of the two components. The requirement of non-rotational fixation may be met in a particularly simple manner by giving the components polygonal/complementary, particularly quadrangular/complementary cross-sections (e.g. in the form of rectangular tubes or tube sections) instead of round/complementary cross-sections. Once the two components presenting the corresponding cross-sections have been combined by insertion, a substantially non-rotational relative position of the two components has been achieved notwithstanding a certain play.

In order to secure against axial relative movements of the two components, a large number of connecting techniques is known from practice, such as studs or socket pins which penetrate bores formed in the walls of the two components and are aligned with each other, snap-in or latch connections including spring-biased latch members on one component which engage complementary latching depressions on the other component, etc. Moreover it is common practice to connect two insertion-connected components by means of a dot or straight weld, a dot or full-surface adhesive bond, or the like.

The two options named last present the drawback that it will generally not be possible any more to separate the two components in a non-destructive way.

Bolts or split-pins penetrating aligned bores in the two components must in turn be secured (studs, spring lock washers etc.) and frequently present an unattractive appearance due to the bolt or pin end portions protruding from the outer circumference of the insertion-connected components. Ball-type locks or the like often only provide low retaining forces and moreover involve high complexity and thus costs.

From DE 60025104T2 and EP1086855B1 a system for connecting two components is known, which includes a first connection member having the form of a tubular flange member which is open on one side and a second connecting member having the form of a mounting member adapted to be inserted with play into the tubular flange member. Inside the flange member a first contact surface and a first groove are provided. The mounting member includes a base body on which a first retaining boss for engagement in the first groove and a guide surface arranged behind the first retaining boss with reference to the direction of introduction are provided. The guide surface is associated to the first contact surface while being inclined at an acute angle relative to the latter. Due to a clamping means which, when actuated, presses against a first pressure surface on the base body, the inclined guide surface presses against the first contact surface to thus jam the mounting member inside the flange member.

SUMMARY OF THE INVENTION

In view of the above, it is the task of the present invention to provide a system in question for the connection of two components whereby the two components may securely be positioned relative to each other, at low complexity in terms of assembly and in an esthetically convincing manner.

In order to achieve this object, the present invention proposes in accordance with a first aspect, a system for the connection of two components, comprising a first connecting member having the form of a tubular flange member which is open on at least one side, with a first contact surface and a first groove being provided inside the flange member; a second connecting member having the form of a mounting member adapted to be inserted with play into the tubular flange member, wherein the mounting member includes a base body; on the base body there are provided a first retaining boss for engagement in the first groove, and a guide surface arranged behind the retaining boss (with reference to the direction of introduction of the second connecting member into the first connecting member) which is associated to the first contact surface while being inclined at an acute angle relative to the latter; and a clamping means which passes through the flange member on the side facing the first contact surface and, when actuated, presses against a first pressure surface on the base body such that the inclined guide surface presses against the first contact surface to thus jam the mounting member inside the flange member.

According to a second aspect of the invention, a system for the connection of two components is provided which comprises a first connecting member having the form of a tubular flange member which is open on at least one side, with a first contact surface and a first groove being provided in the flange member; a second connecting member having the form of a mounting member adapted to be inserted with play into the tubular flange member, wherein the mounting member comprises a base body, on the base body there are provided a first retaining boss for engagement in the first groove, and a guide surface arranged behind the retaining boss (with reference to the direction of introduction of the second connecting member into the first connecting member) which is associated to the first contact surface and inclined at an acute angle relative to the latter; and a clamping means which is connected to the mounting member and, when actuated, presses against the second contact surface inside the flange member so that the inclined guide surface presses against the first contact surface to thus jam the mounting member inside the flange member.

Actuation of the clamping means is effected through an opening in the flange member in the area of the first contact surface.

The two aspects of the invention only differ with regard to the configuration of the clamping means while the basic principle of jamming the second connecting member—mounting member—inside the first connecting member—tubular flange member—remains the same.

In the subject matter of the present invention the two components are thus, in a manner known per se, telescopingly slid or inserted into each other over a certain amount of length. Upon having reached the desired depth of introduction or insertion, the second connecting member present with play inside the first connecting member is urged against the first contact surface of the first connecting member due to the action of the clamping means. As the guide surface associated to the first contact surface is inclined at an acute angle relative to the first contact surface, i.e., guide surface and first contact surface define an acute angle among each other, the second connecting member present with play inside the first connecting member is eventually placed obliquely relative to and inside the latter, and is jammed as a result. Such jamming results in edge or line pressing among the two components and thus in a fixed position of the two components relative to each other, whereby a separating movement of the two components in an axial direction is reliably prevented.

In difference from what is known in the prior art, it is therefore not necessary in the system of the invention, e.g., for bores in the two components to be aligned with each other and then to be penetrated by a common bolt or split-pin. Complex and cost-intense latching mechanisms may moreover be done away with. At a corresponding constructive design of the clamping means there are no components projecting in a substantial manner from the outer circumference of the first connecting member, i.e. the externally disposed component, so that esthetically attractive connections are equally made possible by the connecting system of the invention.

In the absence of set discrete adjustment positions in the form of holes or latching depressions and due to the presence of jamming and thus a clamping effect between the two components which may be brought about in any desired location, the connecting system of the invention therefore allows—at least within a certain range—continuous adjusting or fine adjustment operations among the two components.

Subject matter of the present invention moreover is a mounting member for application in the connecting system of the present invention, comprising a base body, a first retaining boss formed on the base body for engagement in a first associated groove; two guide strips of different height running in parallel with each other and arranged behind the first retaining boss (with reference to the direction of introduction of the second connecting member into the first connecting member); and a first pressure surface which is formed on the side of the base body facing the guide strip.

In a particularly preferred application which is, however, not exclusive, the connecting system of the invention may be utilized in a mirror assembly for automotive vehicles, particularly an exterior rear-view mirror assembly, which comprises a supporting structure having provided at least one mirror head on its one end and at least one mounting member in accordance with the present invention on its other end.

The inclined guide surface is preferably constituted by two guide strips of different height running in parallel with each other and disposed behind the first retaining boss with reference to the direction of introduction of the second connecting member into the first connecting member. Among other things, this allows a particularly simple option in terms of manufacturing technology of realizing the inclined guide surface: depending on the height difference between the free end surfaces of the two guide strips, the angle defined between the first contact surface and the guide surface is acute in a lesser or higher degree; the required jamming and the resulting forces may thus be managed in a particularly simple manner. This configuration furthermore provides in a simple manner the effect of the guide surface being tilted relative to the first contact surface in a direction transverse to the direction of introduction when the mounting member is introduced into the tubular flange member.

The mounting member preferably comprises at least one second retaining boss which engages an associated second groove inside the flange member. This brings about additional securing of the two components relative to each other. In addition it allows to limit the required depth of mutual insertion of the two components.

For reasons of manufacturing technology, the two grooves are preferably realized as continuous openings in the flange member. When the second groove moreover is realized as a notch in the flange member and not as a through opening enclosed on its circumference by the material of the flange member, introduction of the mounting member into the flange member is facilitated.

The guide surface, which assumes the acute angle with the first contact surface as long as the clamping means is not in a clamping condition, and which enters substantially into full-surface contact with the first contact surface upon application of the clamping effect by the clamping means while the two components are jammed with each other, is preferably situated between the two retaining bosses.

The flange member (and thus preferably also the mounting member) each present a quadrangular or rectangular cross-section, in which case the flange member is a rectangular tube. As was already set forth at the outset, in a sense this necessarily has the result of reliably preventing a relative rotation of two components. Ensuring the play between mounting member and flange member thus also ensures the jamming effect between mounting member and flange member, and thus between the two components.

In accordance with one possible development, the clamping means is a screw passing through the flange member which contacts the first pressure surface of the mounting member, so that when the screw is screwed in, the said pressure surface is clamped by the screw into the inside of the connecting system, whereby the mounting member, or its guide surface, is urged against the first contact surface.

In a further preferred manner the clamping means comprises a lever member having a first and a second lever arm, wherein the first lever arm is longer than the second lever arm, with the first pressure surface being realized on the longer lever arm and a second pressure surface being realized on the shorter lever arm. A second contact surface providing a support for the shorter lever arm is formed on the flange member so as to face the second pressure surface. This lever arrangement results in a conversion of the rectilinear advancing movement applied by the screw of the clamping means into a thrusting movement with concurrent magnification of force.

The lever member preferably has the basic shape of a one-quarter disc or a sector having one first and one second leg edge and a round edge interconnecting the two leg edges. The first pressure surface pressed by the screw is arranged on the first leg edge near the round edge. The second pressure surface is located on a projection disposed on the first leg edge near the point where the two leg edges meet, or the sector tip. The round edge is rounded in an axial direction, and the lever member is disposed or mounted in a movable manner in a correspondingly shaped recess in the base body. This configuration allows to obtain high advancing or clamping forces and thus retaining forces in a constructively simple and mechanically stable manner.

In another preferred development, the clamping means may comprise a pressure plate disposed or formed in the base body, with the surface of the pressure plate facing away from the base body defining the first pressure surface that contacts the screw. Independently of the configuration of the base body it is thus possible to provide a defined pressure surface for the screw which in turn is provided by the surface of the pressure plate.

Here the pressure plate may either be a separate component arranged on or in the base body, or the pressure plate or pressure surface, respectively, is formed immediately on or in the base body, for instance by way of partial surface hardening. In practice, separately forming the pressure plate and arranging it in a corresponding receiving depression on the part of the base body is presumed to be preferable for reasons of manufacturing technology.

If the pressure plate is disposed in the receiving depression on the part of the base body, it may in a given case be adapted to be tilted within a plane parallel with the longitudinal axis of the first connecting member. Such tilting of the pressure plate may under certain circumstances be assisted, for instance, by a spherical/bulging formation of a countersurface on the part of the base body against which the pressure plate is supported.

Further details, aspects and advantages of the present invention will become apparent from the following description while making reference to the drawings, wherein:

For clarity, the following list is provided of reference symbols included in the various figures:

2 connecting system
4 second component
6 first component
8 tubular flange member of 6
10 reception on 4
12 mounting member
14 base body of 12
16a, 16b vertical side walls of 14
18a, 18b vertical inner side walls of 8
20 top wall of 8
22 bottom wall of 8
24 slit-type opening in 20
26 opening, oblong hole in 20
28 free edge of 8
30 opening in 22
32 sleeve
34 locking screw in 30
36 first retaining boss on 14
38 second retaining boss on 14
40 reception chamber in 14 for lever member 42
42 lever member
44 clamping means
46 first leg edge of 42
48 second leg edge of 42
50 tool opening in 34
52 arcuate round edge of 42
54 counter-profile for 52 in 14
56 projection on 42
58 guide surface on 14
60 first contact surface on 8
62 left-hand, lower guide strip
64 right-hand, higher guide strip
66 pressure surface (corresp. to leg edge 46)
68 second pressure surface (or end of projection 56)
69 second contact surface
70 lower free edge of 14
72 pressure plate
74 receiving depression
100 clamping means
102 screw hole in 14
104 upper end of 102
106 lower end of 102
108 clamping screw, stud screw
110 screw head
112 screw foot
114 access opening in 8

DETAILED DESCRIPTION OF THE PREFERRED EMBODIMENT

A system for the connection of a first component 6 and a second component 4 is globally shown at 2 in the drawings. The first component 6, which is on the right side in FIG. 1, comprises a tubular flange member 8 having the rectangular cross-section visible in FIG. 3. The second component 4, which is adapted to be connected to the first component 6, equally presents a rectangular cross-section. On its free end as seen on the left in FIGS. 1 and 2, the second component 4 comprises a reception 10 allowing to fasten a further component to component 4.

In a concrete embodiment or optional application which should, however, not be understood in a limiting sense, the first component 6 is adapted to be connected to a vehicle body through the intermediary of a mirror foot (not represented), and the second component 4 directly or indirectly carries a vehicle rear-view mirror via the reception 10.

At its one end facing away from the reception 10, the component 4 is provided with a mounting member 12 having a base body 14. As may be seen in the drawing, the latter is adapted to be introduced into the hollow interior of the first component 6 from the open end of the latter, with a certain play being present between base body 14 and component 6, or between vertical side walls 16a and 16b of the base body 14 and adjacent vertical inner side walls 18a and 18b of component 6 (see FIG. 3).

The first component 6 has two openings 24 and 26 in an upper top wall 20, with the opening 24 being realized as a slit or notch extending from the free edge 28 of component 6 in the direction of introduction of component 4 into component 6. The opening 26 together with the opening 24 is aligned along the longitudinal axis L of the component 6 at a certain spacing from the latter and pierces the top wall 20 in the form of an oblong hole.

In the bottom wall 22 of component 6 facing the top wall 20, a further opening 30 is provided which in a top view is situated between the openings 24 and 26 and in which a locking screw 34 is guided by means of a sleeve 32.

Figure 1:
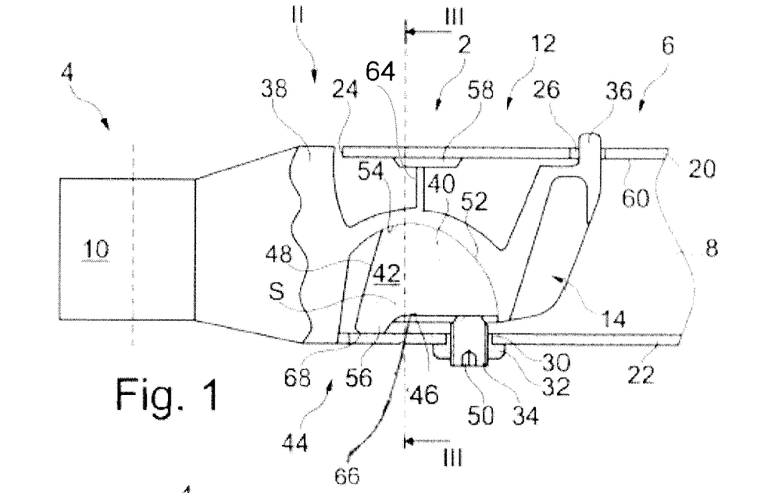
FIG. 1 is a partially sectional lateral view of a connecting system in accordance with a first embodiment.
Figure 2:
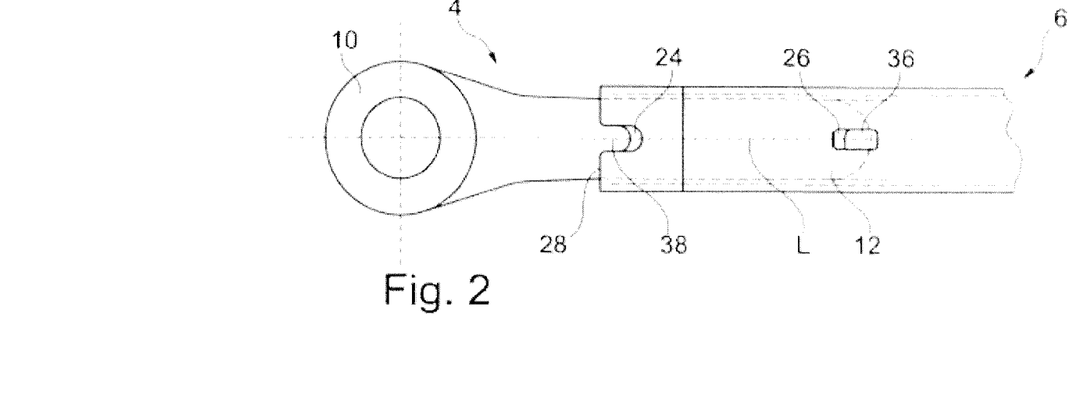
FIG. 2 is a top view of the connecting system when taken along the direction of arrow II in FIG. 1.

The mounting member 12 comprises a first retaining boss 36 which is formed on the base body 14 and adapted to be engaged with the opening 26 in the manner evident from FIGS. 1 and 2. Moreover the mounting member 12 comprises a second retaining boss 38 which is adapted to be engaged with the opening 24 in the manner evident particularly from FIG. 2.

In the base body 14 of the mounting member 12 there is a reception chamber 40 in which a lever member 42 is disposed.

The lever member 42 is a body having, in the lateral view of FIG. 1, a sector-type shape in the manner of a piece of pie and forming, jointly with the locking screw 34, a clamping means 44. The lever member 42 or the sector defining the lever member 42 has a first leg edge 46 and a second leg edge 48, with the two leg edges defining an angle of approximately 90 degrees (±20 degrees) between each other. In the manner evident from FIG. 1, the end of the locking screw 34 facing away from a tool opening 50 is in contact with the first leg edge 1. Between the two leg edges 46 and 48 there extends an arcuate round edge 52 supported against a correspondingly rounded counter-profile 54 which is part of the base body 14 defining the reception chamber 40. Here it is possible for additional guide means to be provided between the round edge 52 and the counter-profile 54, for example a strip on the part of the counter-profile 54 that engages a corresponding groove on the part of the round edge 52 (with sufficient play so as to allow a tilting movement of the base body 14 relative to the lever member 42, to be described later on) and allows a rotating or pivoting movement of the lever member 42 along the counter-profile 54 about an imaginary axis of rotation S.

In the location where the two leg edges 46 and 48 meet with their ends facing away from the round edge 52 to thus form the tip of the sector, a projection 56 is formed which is supported by its free end against the inner surface of the bottom wall 22. In the cross-sectional view according to FIG. 1, the free end of the projection 56 preferably is rounded or spherical.

On the base body 14 there is moreover formed a guide surface 58 facing in the direction of the inner side of the top wall 20, with this inner side of the top wall 20 being defined as the first contact surface 60. The guide surface 58 is configured such as not to extend in parallel with the first contact surface 60 but instead defines an acute angle with it. In the practical example represented in the drawing, this is realized in that the base body 14 presents two guide strips 62 and 64 of different height which run in parallel between the two projections 36 and 38. In the sectional view of FIG. 3, the left guide strip 62 has a lower height dimension than the right guide strip 64, i.e., when the upper free end of the guide strip 64 (corresponding to a part of the guide surface 58) is in contact against the first contact surface 60, the upper free end of the guide strip 62 (equally corresponding to a part of the guide surface 58) is spaced apart from the opposed first contact surface 60 by a distance h.

The first leg edge 46 of the lever member 42 serves as a first pressure surface 66, and the end of the projection 56 on the lever member 42 serves as a second pressure surface 68.

In order to connect the two components 4 and 6 to each other, component 4 with mounting member 12 is inserted into the open end of component 6, with component 4 and component 6 being slightly oblique to each other in the lateral view of FIG. 1, so that the upper free end of retaining boss 36 may slide along the first contact surface 60 inside component 6 until the first retaining boss 36 comes to lie in the opening 26. Substantially at this point of time the second retaining boss 38 enters into engagement with the opening or notch 24 in the top wall 20.

Figure 3:
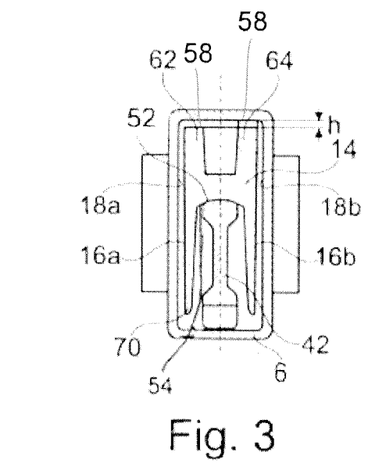
FIG. 3 is a sectional view of the connecting system when taken along line III-III in FIG. 1.

The locking screw 34 is screwed into the sleeve 32 and thus into the inside of component 6 with the aid of a tool inserted into the opening 50, with pressure being then exerted onto the first leg edge 46 or the first pressure surface 66 via the locking screw 34. This pressure brings about a counter-clockwise pivoting movement of the lever member 42 in the view of FIG. 1, with the round edge 52 sliding on the counter-profile 54. This pivoting movement takes place while the projection 56 or the second pressure surface 68 is supported against a second contact surface 69 on the inner side of the bottom wall 22; a levering effect and thus a magnification of force is thus created due to the different distances between the projection 56 or the second pressure surface 68 and a line extending through point S and the point of the attack of the locking screw 34 on the first leg edge 46 or the first pressure surface 66 and the line extending through point S. This force, which is magnified in accordance with the lever principle, is passed on by the lever member 42 via the counter-profile 54 to the base body 14 and thus to the two guide strips 62 and 64, with the different heights of the two guide strips 62 and 64 having the result that the guide strip 64 situated on the right in FIG. 3 is the first to contact the first contact surface 60. A further advancing movement of the locking screw 34 then brings about tilting of the base body 14 or of the mounting member 12 inside component 6 in the direction of the arrow in FIG. 3, such that the upper free end of the guide strip 62 approaches the first contact surface 60.

This tilting movement of the base body 14, and thus of component 4, relative to component 6 is facilitated by a complementary/spherical or arcuate formation of the surface between the round edge 52 and the counter-profile 54, i.e., this surface is rounded in the axial direction (direction perpendicular to the plane of the drawing sheet of FIG. 1). This necessitates a corresponding configuration of the round edge 52 and the counter-profile 54 as concave/convex or convex/concave, with the convex/concave configuration (round edge 52/counter-profile 54) being represented in FIG. 3.

Concurrently with the pivoting movement of the base body 14 or mounting member 12 inside component 6 there occurs jamming in the area of a lower free edge 70 between the lateral inner wall 18a of component 6 and the base body 14, so that the two components 4 and 6 are clamped in each other by this jamming or line pressing.

A movement of the base body 14 in an axial direction relative to the flange member 8 is entirely or substantially prevented by to the engagement of the projection or retaining boss 36 in the groove 26, so that the clamping or tightening operation by means of the locking screw 34 is not weakened or even defeated by any yielding movements of the base body 14 relative to the flange member 8. On the other hand, the engagement of retaining boss 36 and groove 26 does not interfere with tilting or inclining the base body 14 relative to the flange member 8 (component 4 relative to component 6) so as to realize the desired clamping or retaining effect.

In order to release the connection between components 4 and 6 it is sufficient to neutralize the force applied to the lever member 42 by turning out the locking screw 34 so that the tilt or jam of the component 4 relative to the component 6 is released, after which the component 4 may be pulled out from the component 6, if necessary.

Under the proviso of corresponding longitudinal dimensioning of openings 24 and 26, it is thus also possible to continuously adjust component 4 relative to component 6 by a certain amount which is determined by the dimension of the openings 24 and 26.

Figure 4:
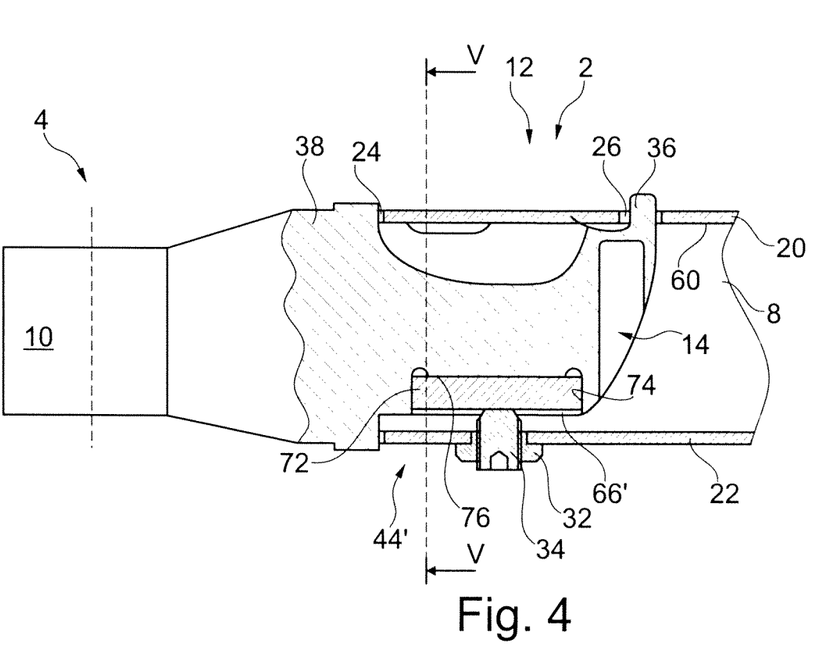
FIG. 4 is a view of a second embodiment corresponding to FIG. 1.

In a representation corresponding to FIG. 1, FIG. 4 shows a second development of a connecting system of the present invention 2, wherein same or corresponding portions or parts, or portions or parts serving entirely or substantially equivalent functions, are designated by the same reference symbols as in FIG. 1. The same is true for the sectional representation of FIG. 5 with a view to FIG. 3.

Figure 5:
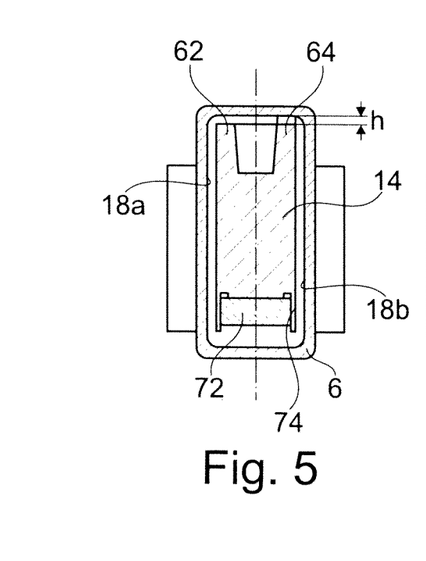
FIG. 5 is a sectional view taken along line V-V in FIG. 4 which corresponds to FIG. 3.

As an essential difference from the development of FIG. 1, the system 2 according to FIG. 4 comprises a pressure plate 72 which is received, in the manner visible in FIGS. 4 and 5, in a receiving depression 74 realized in the base body 14. Here the pressure plate 72 may either be realized as a component separate from the base body 14—as is shown in FIGS. 4 and 5—or it may be formed of the material of the base body 14, e.g. by partial surface treatment such as hardening. At its surface facing away from the base body 14, the pressure plate 72 defines the first pressure surface 66' which is contacted by the free end of the locking screw 34.

If the pressure plate 72 is realized as a separate component and retained in the receiving depression 74, one of the two contact surfaces between pressure plate 72 and base body 14 may be formed to be planar and the other one spherical or otherwise different from the planar shape, e.g. comprising a projection or a strip/rib, for instance a countersurface 76 forming the bottom of the receiving depression 74. As a result, and under the condition of being received in the receiving depression 74 with sufficient play, the pressure plate 72 is capable of performing limited tilting movements within a plane in parallel with the longitudinal axis L (FIG. 2). Such tilting movements are suited to assist an inclination of the base body 14 and thus jamming for positional fixation if the base body 14 is raised in FIG. 5 by tightening the locking screw 34 with concurrent application of pressure onto the pressure surface 66', so that the base body 14 assumes an oblique position inside the connecting member 6 on account of the height difference h.

What was said in the foregoing with regard to function, operation and advantages with regard to the first embodiment of FIGS. 1 to 3 equally or analogously applies to the embodiment of FIGS. 4 and 5, with a repeated discussion thereof being consequently omitted.

The connecting 2 system of the invention is characterized by a sturdy and reliable construction, simple handling properties, vibrational safety and esthetic appearance, for the only elements of the connecting system 2 that are visible on the outside are the free end of the first retaining boss 36 projecting through the opening 26, and on the opposite side the locking screw 34 or its sleeve 32, respectively. The entire clamping mechanism, particularly the lever member 42 with its round edge 52 and the counter-profile 54, are present in a protected location inside the component 6 and are thus protected to the largest possible extent against dust, weathering, etc.

Figure 6:
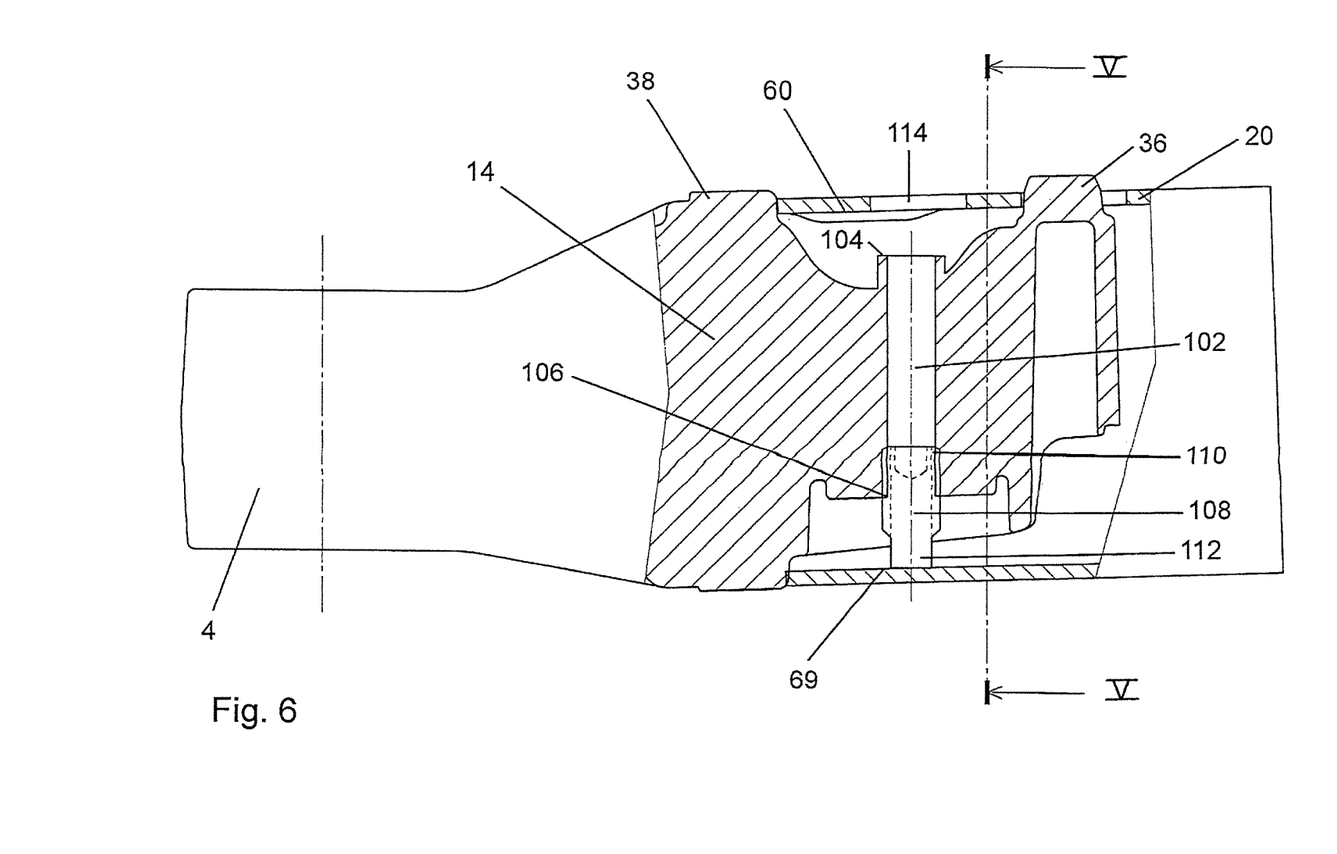
FIG. 6 is a view of a third embodiment which corresponds to FIG. 1.
Figure 7:
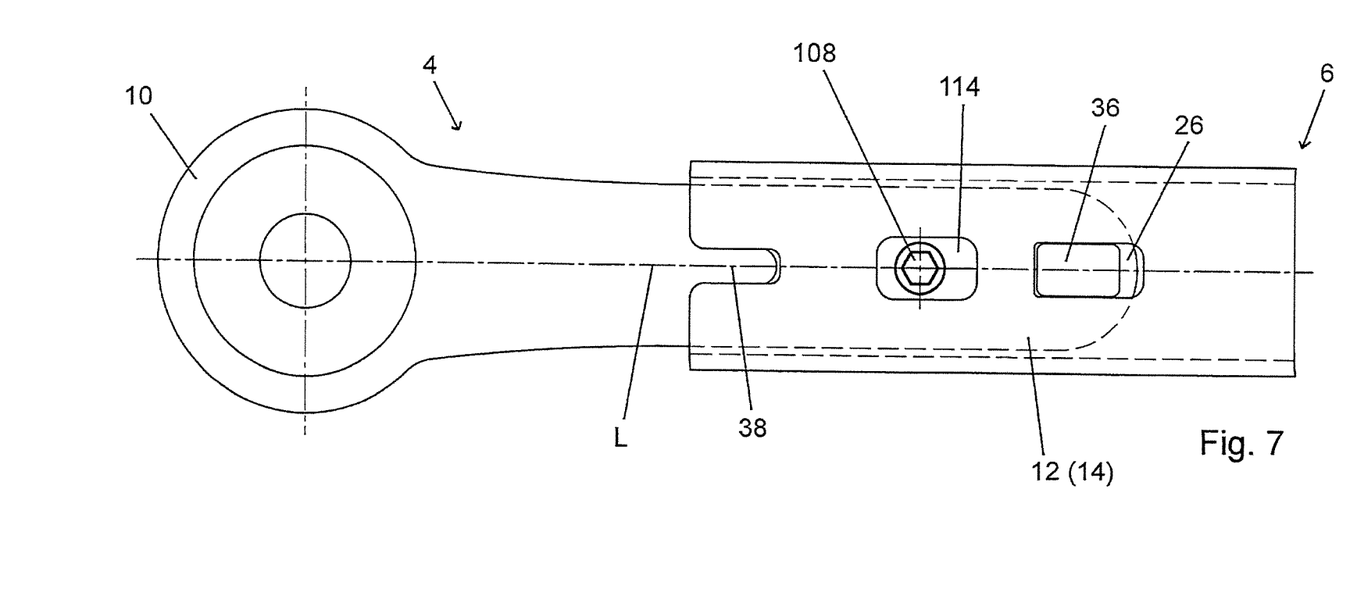
FIG. 7 is a corresponding top view of the third embodiment.
Figure 8:
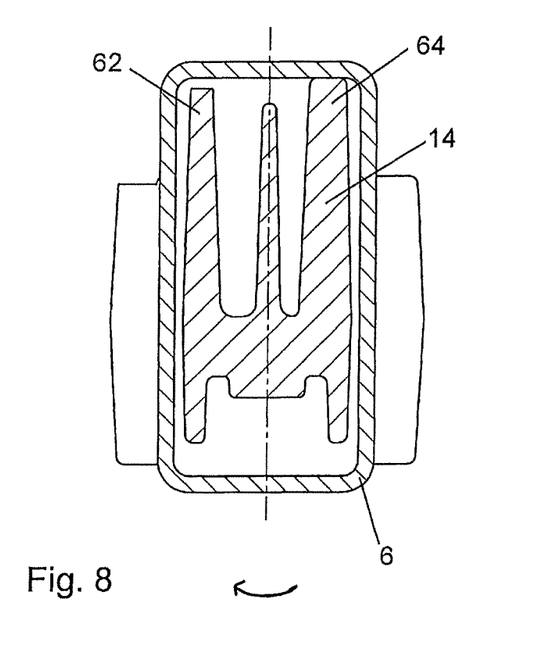
FIG. 8 is a sectional view taken along line V-V in FIG. 6 which corresponds to FIG. 3.

FIGS. 6 to 8 show a third embodiment of the embodiment which differs from the first and second embodiments in the different configuration of the clamping means 100. The unchanged components are designated by the same reference symbols as in FIGS. 1 to 5.

The clamping means 100 includes a screw hole 102 extending toward a position between the top wall 20 and the bottom wall 22 and penetrating the mounting member 14, and which has an upper end 104 facing the top wall 20 and a lower end 106 facing the bottom wall 22. Into the screw hole 102 a clamping screw 108 having the form of a stud screw comprising a screw head 110 and a screw foot 112 is screwed. The screw foot 112 protrudes beyond the lower end 106 of the screw hole 102 and is supported against the second contact surface 69 on the inside of the top wall 22. Above the upper end 104 of the screw hole 102, in the area of the first contact surface 60, the access opening 114 penetrating the flange member 8 is provided which permits access to the stud screw 108 by means of a tool. In the first and second embodiments of the invention, actuation of the clamping means 44 or 44' is effected through the opening 30 including sleeve 32 and screw 34 in the bottom wall 22 of the flange member 8, whereas in the third embodiment, actuation of the clamping means 100 is effected via the access opening 114 in the top wall 20 of the flange member 8.

It should be understood that the above description of preferred embodiments is to be understood as purely illustrative and not limiting. Thus in particular the configuration of the clamping mechanism allowing to bring about and maintain jamming and thus frictional engagement of the two components 4 and 6 among each other, is not restricted to the represented practical example having the sector-type lever member 42. It is furthermore possible to select cross-sectional shapes for the components 4 and 6 that are different from the represented elongate/rectangular cross-sectional shape, as long as it is ensured that jamming or clamping of the two components 4 and 6 in each other within the meaning of the present invention may be brought about and maintained through a corresponding mechanism.

What is claimed is:

1. A system for the connection of first and second components, comprising:
   a first component defining a first longitudinal axis through a center thereof, and including:
   a tubular flange member which is open on at least one side, with a first contact surface on an inner surface of the tubular flange member, and a first groove being provided through an outer wall of the tubular flange member,
   a second component defining a second longitudinal axis through a center thereof, and including a mounting member adapted to be inserted with play into the tubular flange member along said first longitudinal axis, the mounting member including:
   a base body having a first retaining boss for engagement in the first groove, and
   a guide surface arranged behind the first retaining boss and facing toward said first contact surface, wherein the guide surface is defined by a plane extending between two parallel, longitudinally extending guide strips of different height facing towards the first contact surface such that the guide surface forms an acute angle with the first contact surface, where a first of said guide strips is in contact with the first contact surface, and the second guide strip is spaced apart from the first contact surface; and
   a clamping means configured to press against a first pressure surface of the base body, between the guide strips, towards the first contact surface, the clamping means comprising a screw which passes through the flange member on a side opposite the first contact surface and, when the screw is actuated, the second guide strip is moved towards the first contact surface to evoke a twisting movement of the base body about the second longitudinal axis to jam the mounting member inside the flange member.

2. The system according to claim 1, characterized in that the clamping means comprises a lever member having a first and a second lever arm,
   the first lever arm is longer than the second lever arm,
   the first pressure surface is formed on the first, longer lever arm and a second pressure surface is formed on the second, shorter lever arm, and
   inside the flange member a second contact surface is formed so as to face the second pressure surface.

3. The system according to claim 2, characterized in that the lever member comprises a first and a second leg edge and a round edge interconnecting the two leg edges,
   the first pressure surface is arranged on the first leg edge near the round edge,
   the second pressure surface is provided on a projection which is arranged on the first leg edge near the point where the two leg edges meet;
   and
   the lever member is movably arranged in a correspondingly shaped recess in the base body.

4. The system according to claim 2, characterized in that the clamping means comprises a pressure plate arranged or formed in the base body, whose surface facing away from the base body defines the first pressure surface which contacts the screw.

5. The system according to claim 4, characterized in that the pressure plate is separate from the base body.

6. The system according to claim 5, characterized in that the pressure plate is arranged in a receiving depression on the side of the base body and adapted to be tilted in a plane parallel with a longitudinal axis of the first component.

7. The system according to claim 5, characterized in that the pressure plate is supported on a spherically shaped countersurface on a part of the base body.

8. The system according to claim 1, characterized in that the guide surface is tilted relative to the first contact surface at an acute angle in a direction transverse to a direction of introduction when the mounting member is introduced into flange member.

9. The system according to claim 1, characterized in that the mounting member includes at least one second retaining boss which engages an associated second groove in the flange member.

10. The system according to claim 9, characterized in that the second groove has the form of a notch in the flange member.

11. The system according to claim 9, characterized in that the guide surface is arranged between the two retaining bosses.

12. The system according to claim 1, characterized in that the first groove has the form of continuous openings in the flange member.

13. The system according to claim 1, characterized in that the flange member is a rectangular tube.

14. The system according to claim 1, wherein said two components are configured to connect a mirror to an automotive vehicle.

* * * * *